United States Patent [19]

Taxon et al.

[11] Patent Number: 4,655,396

[45] Date of Patent: Apr. 7, 1987

[54] ELECTROMAGNETIC FUEL INJECTOR

[75] Inventors: Morse N. Taxon, Oak Park; Gene A. Maguran, West Bloomfield, both of Mich.

[73] Assignee: United Technologies Diesel Systems, Inc., Springfield, Mass.

[21] Appl. No.: 780,107

[22] Filed: Sep. 25, 1985

[51] Int. Cl.[4] .......................... F02M 61/20; B05B 1/30; F16K 31/02

[52] U.S. Cl. .................................. 239/533.9; 239/585; 251/129.14; 251/129.16; 251/129.21

[58] Field of Search ................ 239/585, 533.3-533.12; 251/129.14, 129.16, 129.21; 335/276

[56] References Cited

U.S. PATENT DOCUMENTS

| | | | |
|---|---|---|---|
| 2,857,494 | 10/1958 | Lace | 335/276 |
| 4,354,640 | 10/1982 | Hans | 239/533.9 |
| 4,390,136 | 6/1983 | Linssen et al. | 239/585 |
| 4,394,973 | 7/1983 | Sauer et al. | 239/585 |

*Primary Examiner*—Andres Kashnikow
*Assistant Examiner*—Patrick N. Burkhart
*Attorney, Agent, or Firm*—Stephen A. Schneeberger

[57] ABSTRACT

An electromagnetically-actuated fuel injector of the type having a spring-biased flat armature and a ball valve element is provided with an improved arrangement for preventing wobble or flutter of the armature, particularly during operation. The substantially-circular armature includes a portion contoured to define a pivot axis for the armature as it engages a stationary part of the injector. This pivot axis is conveniently provided by a chordal edge on the armature. This arrangement aids in reducing wobble by the armature and is further enhanced by concentrating the spring force on the armature remote from the pivot axis. This concentrated spring force is obtained by providing a spring seat on the armature which is inclined such that the spring experiences greater compression where the spring force is required.

10 Claims, 3 Drawing Figures

FIG. 1A
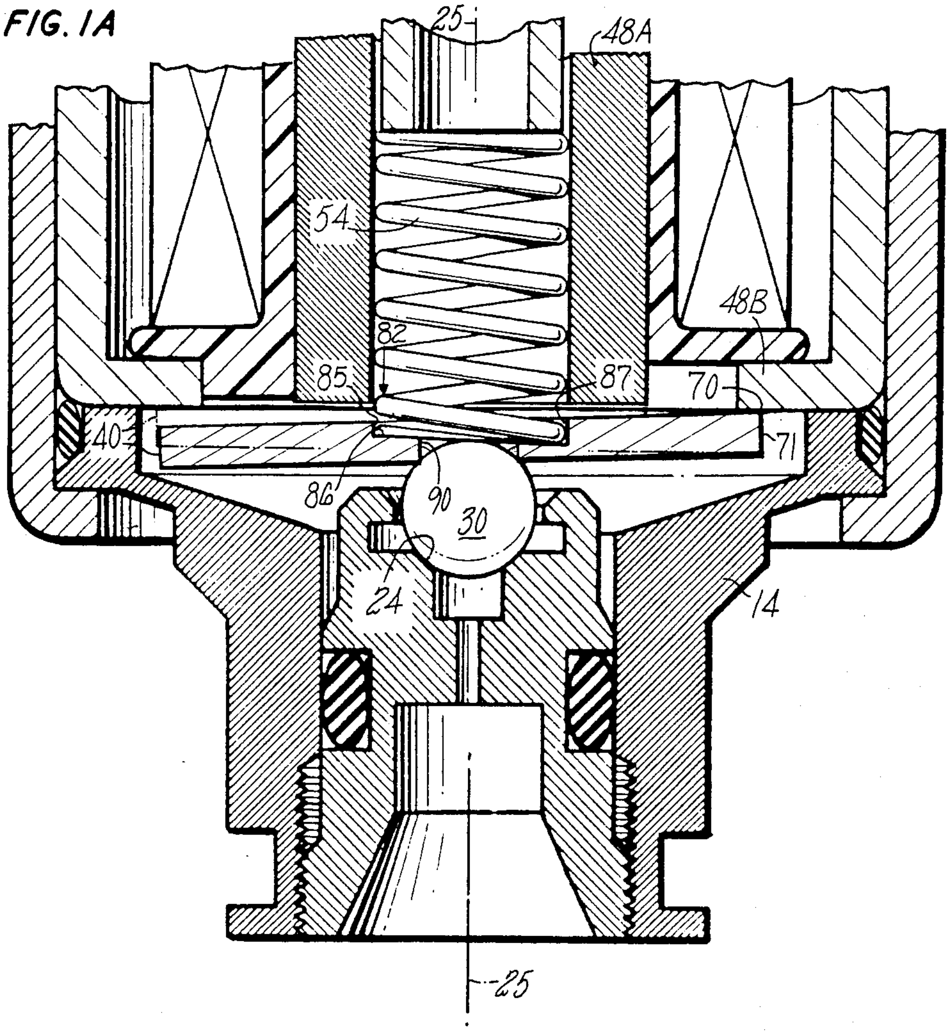
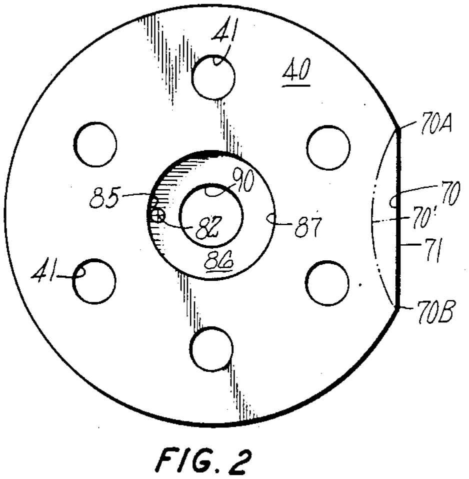
FIG. 2

ELECTROMAGNETIC FUEL INJECTOR

DESCRIPTION

1. Technical Field

The invention relates to an electromagnetic fuel injector and more particularly to an injector of the type employing a relatively thin, or flat, armature for controlling the displacement of a valve element.

2. Background Art

In the prior art it has been known to employ flat, or flat-faced armature-pole piece arrangements in electromagnetic fuel injection valves. As used herein, the term "flat armature" is used to denote an armature-pole piece arrangement in which substantially all of the force of the magnetic attraction between the two is parallel to the axis of the valve. Further, such "flat armature" is typically much thinner in the axial direction than in the radial direction. It is also known for such injectors with flat armatures to also employ ball-type valves. Such injectors optimize the use of the magnetic forces and are of relatively low cost to manufacture. Examples of such injectors with flat armatures and ball-type valves are shown in U.S. Pat. Nos. 4,186,883; 4,354,640; 4,356,980; 4,390,130; and 4,474,332.

A possible disadvantage in the aforementioned type of flat-armature injector valve resides in the possible uncontrolled wobble or fluttering movements of the flat armature before, during and after actuation. Such fluttering movement may be random in its occurrence and/or in its positioning about the circumference of the normally-circular flat armature and thus, may adversely affect the dynamic fuel flow linearity and/or pulse-to-pulse repeatability of the fuel injector. On the other hand, many engine control strategies rely upon stability and repeatability of fuel injector operation.

The aforementioned U.S. Pat. Nos. 4,354,640 and 4,390,130 describe arrangements for controlling the motion of the flat armature during opening and closing of the valve so as to control or eliminate possible fluttering of the armature. In the aforementioned U.S. Pat. No. 4,354,640, the flat armature is supported on a first side so as to pivot about a tilt edge provided on that side and remote from the valve seat and is retained at the tilt edge on this side by the force of a spring which engages the other side of the flat armature oriented toward the valve seat. The unilateral retention of the flat armature at the tilt edge provides unequivocal upward and downward movement of the flat armature. An alternative to the foregoing arrangement is disclosed in U.S. Pat. No. 4,390,130 where the armature is pivotably supported on its side remote from the valve seat, or on the side oriented toward the valve seat, on a spring tongue which is preferably embodied out of a remnant air disc.

In each of those two arrangements, it is necessary to provide a secondary spring in addition to the normal primary spring which is coaxially positioned in the injector. That secondary spring might be provided by deforming a part of the remnant air disc if the injector is of a type which employs such disc, otherwise the installation of a separate spring is required.

DISCLOSURE OF INVENTION

It is an object of the present invention to provide an electromagnetic fuel injector having a flat armature and including an improved mechanism for controlling possible wobbling of the armature. Included within this object is the provision of such mechanism without requiring a secondary spring for controlling armature wobble.

Accordingly, there is provided an improved electromagnetic fuel injector for an internal combustion engine having a valve axis and including a housing, a flat armature connected to a movable valve element arranged to cooperate with a valve seat and a spring for exerting a force in an axial direction on the armature, and electromagnetic means for exerting a force in an opposite direction on the armature when electrically energized. The spring is disposed in substantially coaxial alignment with the valve axis and has an end in compressive engagement with the armature. According to the improvement, the armature is of generally circular shape and has a portion in the region of its circumference contoured so as to provide a pivot axis, about which the armature may pivot when in engagement with a stationary part of the injector. This pivot axis is conveniently provided by a straight, chordal edge on the armature. Additionally, the spring, which may be a helical coil spring, is either configured or arranged to supply a greater force to one side of the armature. Specifically, the spring applies the greater force to the side of the armature opposite the pivot axis. This is accomplished by inclining the spring seat surface on the armature or possibly by contouring the spring itself. The resulting operation of the armature and injector is very stable and repeatable.

BRIEF DESCRIPTION OF THE DRAWINGS

FIG. 1A is an enlarged view of a portion of the injection valve of FIG. 1; and FIG. 2 is a plan view of the armature in accordance with the invention.

BEST MODE FOR CARRYING OUT THE INVENTION

Figure 1:
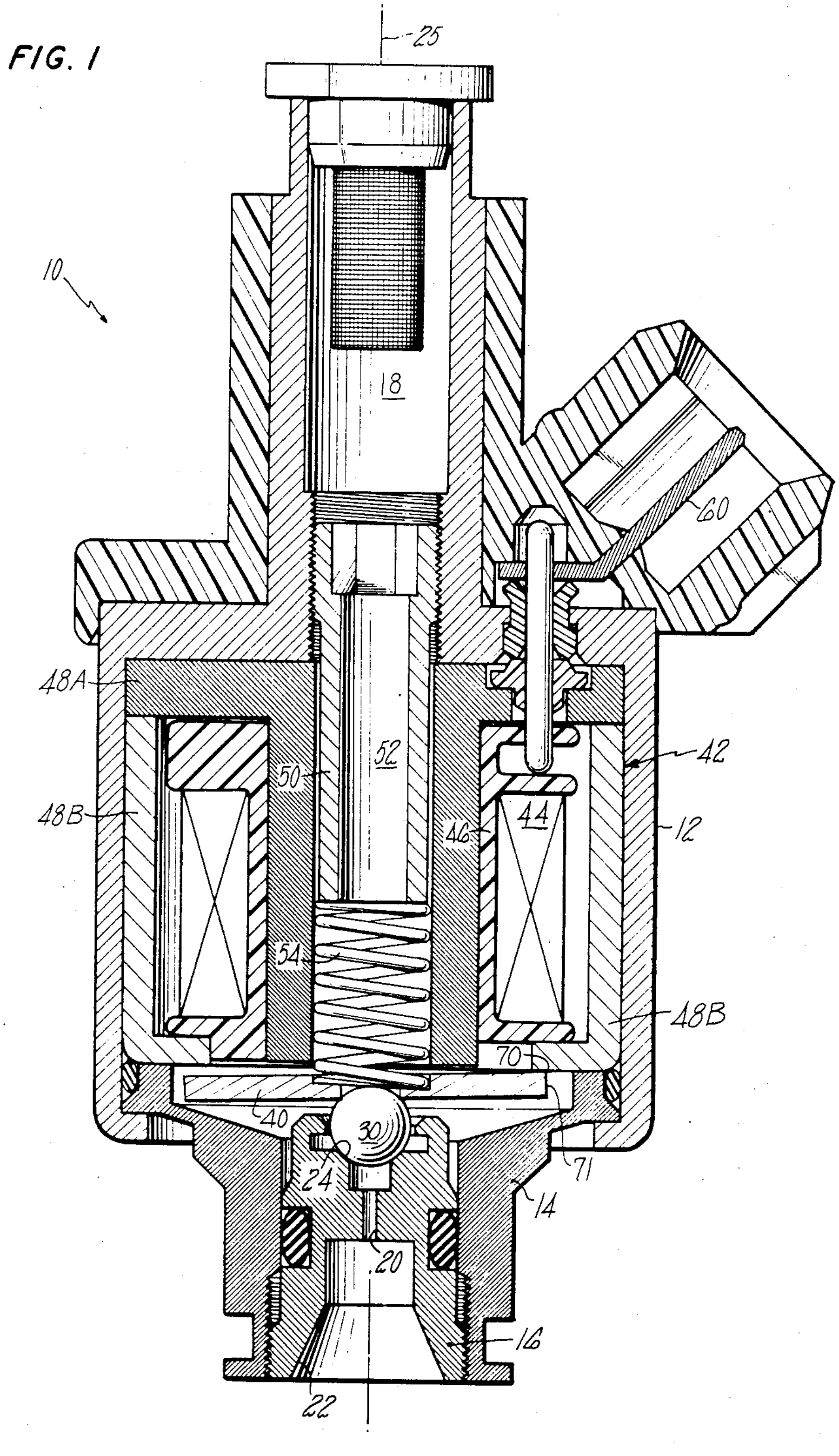
FIG. 1 is an axial, sectional view of a fuel injector in accordance with the present invention.

Referring to FIGS. 1 and 1A there is illustrated, in axial section, an electromagnetically-actuated fuel injector 10 in accordance with the invention. A generally-elongated tubular housing is provided by a tubular housing member 12 of nonmagnetic material, a valve container ring 14 and a valve body 16. The housing member 12 comprises the upper portion of the injector housing, with the lower remaining portion being formed by the valve container ring 14 and the valve body 16. The housing 12 is open at its upper end to provide a fuel inlet 18. The lower end of housing member 12 is deformed inwardly to provide an upwardly-facing flange, which engages a downwardly-facing shoulder on an annular rim of valve container ring 14 to axially retain the container ring. The valve body 16 may be mounted in a threaded bore in the valve container ring 14 and includes one or more passages or orifices 20 extending therethrough for metering fuel to be supplied to a discharge nozzle portion 22. A fixed valve seat 24 is formed toward the upper end of the valve body 16. The valve seat 24 may typically be provided by machining a truncated, conical surface in coaxial alignment with the axis 25 of the injector 10.

The movable valve element is a ball element 30 which is firmly connected as by welding, with a flat armature 40. The flat, washer-shaped armature 40 is formed of magnetic material, such as low carbon steel, and is generally circular, its diameter extending transversely of the axis 25 of injector 10, and its thickness in the axial direction being substantially less than its diameter. Armature 40 includes a plurality of openings 41 extending axially therethrough to facilitate displacement of the armature relative to the fuel and to provide a flow path for the fuel when the injector is energized. The geometry of armature 40 is modified somewhat in accordance with the invention, as will be hereinafter described in greater detail.

The armature 40 is part of an electromagnetic motor or solenoid 42 which is concentrically housed within housing member 12. The solenoid 42 is entirely contained within the lower portion of housing 12 and includes a coil 44 coaxially disposed on a tubular nonmagnetic bobbin 46 which is in turn coaxially disposed between the radially inner and outer sections 48A and 48B, respectively of an annular magnetic frame 48. The inner section 48A of the magnetic frame 48 includes a cylindrical, fluid-passing bore extending therethrough. A spring adjuster 50 is threadedly inserted into the upper end of housing 12. The spring adjuster 50 includes a fluid-passing bore 52 extending coaxially therethrough. A helical spring 54 is positioned coaxially within the central bore of magnetic frame 48A in compressive engagement with the lower end of spring adjuster 52 and the upper surface of armature 40 to apply a downward, or closing, biasing force to the upper surface of armature 40 and thus also to the ball valve 30. Adjustment of the axial positioning of adjuster 52 is used to vary the biasing force applied by spring 54 to the ball valve 30.

Generally speaking, spring 54 acts against armature 40, and thus ball valve 30 to keep the valve of injector 10 normally closed. An electrical current applied to coil 44 via an electric plug connection 60 serves to develop a magnetic field which acts on armature 40 to move it axially upward toward and into engagement with the outer magnetic frame portion 48B. Typically, the armature 40 will engage the undersurface of outer magnetic frame 48B and be retained thereat so long as the current is maintained. In this position, the ball 30 is spaced from the seat 24 and fuel is permitted to flow through the injector 10, for metering at orifice 20 and subsequent discharge through nozzle 22. The inner magnetic frame 48A is somewhat shorter in the axial direction, i.e. by 0.002–0.005 inch, than the outer frame 48B to provide a nonmagnetic air gap which facilitates release of armature 40 when the coil 44 is de-energized.

Although not separately shown, the upper surface of armature 40 and the lower surface of magnetic frame 48B are provided with respective coatings which serve a dual function. The coatings on the armature 40 and the magnetic frame 48B may be nickel and chrome, respectively. The coating on frame 48B provides a nonmagnetic "air" gap which facilitates release of armature 40 when the coil 44 is de-energized and the combined coatings provide wear resistance for their less-resistant, low-carbon steel substrates.

In accordance with an aspect of the invention and referring additionally to FIG. 2, it will be seen that the generally circular armature 40 includes a portion contoured to provide a pivot axis, as represented here by the straight edge or chord 70, formed near one radial extreme of the armature. The chordal edge 70 is the corner formed by the right-angle transition or intersection between the upper and the peripheral surfaces of the armature 40. This chordal edge 70 is most easily formed by machining or otherwise forming a flat or a chord 71 in the periphery of armature 40, however, it will be appreciated that the upper surface of armature 40 might also be beveled or inclined in a manner to provide a resulting straight edge 70 to serve as the pivot axis. In either event, the resulting straight edge 70 provides a straight-line axis about which armature 40 may pivot when that axis is in engagement with the undersurface of the stationary magnetic frame portion 48B. The straight-line contact between the pivot axis of the chordal edge 70 and the magnetic frame 48B tends to resist any attempt by the armature 40 to roll or wobble on its circumference. It will be understood that a similar pivot axis may be defined by as few as two points aligned on the armature 40 and in simultaneous contact with frame 48B. An example of the latter is represented by the points 70A and 70B at the opposite ends of the radially-inwardly curved edge 70' formed by the "mouse bite" shown in broken line in FIG. 2.

As an additional aspect of the invention, it is desirable that the spring force applied by spring 54 to the armature 40 be concentrated at a point or region of the armature which is on the opposite side of the injector axis 25 from the pivot axis determined by edge 70. This region of concentrated spring force is represented by the force vector arrow 82 in FIG. 1A. The preferred arrangement for concentrating the spring force at this position remote from the chordal edge 70 involves providing the armature 40 with an inclined spring seat 86 in its upper surface. The spring seat 86 is inclined such that it is shallowest at its side 85 remote from the pivot axis determined by edge 70 and deepest at its edge 87 which is relatively closest to that edge 70. The spring 54 is of the type which is squared and ground in a conventional manner at its opposite ends. The squaring and grinding of the opposite ends serves to dispose the coil which forms each of the opposite ends in a plane which is substantially perpendicular to the axis of the spring and thus, also to the armature and the valve. However, because the spring seat 86 is shallower at its side 85 than at its side 87, the spring 54 is relatively more compressed at the former side and thus applies most of the spring force thereat, as represented by force vector arrow 82.

In the illustrated embodiment, the spring seat 86 is circular, is downwardly recessed into the upper surface of armature 40 substantially along injector axis 25 and has one side inclined relative to the other to provide the requisite inclination to the spring seat. Seat 86 may conveniently be formed by a punching or coining operation at the time the armature 40 is stamped from sheet stock. In the illustrated embodiment, the armature has a circular diameter of approximately 0.680 inch and an axial thickness of about 0.050 inch, the spring 54 has an outside diameter of approximately 0.205 inch, and the spring seat 86 has a diameter of approximately 0.2150 inch. The spring 54 may have a spring rate of, for example, 7 or 15 pounds per inch. The spring seat 86 is inclined at an angle of less than about 10°, typically about 2°–4°, to a plane normal to the injector axis 25. The flat 71 formed on the periphery of armature 40 is of such radial depth that the resulting chordal edge 70 has a length of about 0.280 inch and is bisected by a plane which includes the injector axis 25 and the shallowest and deepest points 85 and 87, respectively of the spring seat 86. A bore 90 extends through armature 40 along injector axis 25. Bore 90 is of smaller diameter than the bore for spring seat 86 and receives the upper end of ball valve element 30. The uppermost end of ball valve 30 may be received within the internal diameter of spring 54.

As an alternative to the inclined seat 86 as a means for concentrating the spring force in the region indicated by arrow 82, the spring seat might instead be a flat surface normal to injector axis 25 and the spring 54 might have its lower end formed in the manner described in the cross-referenced application Ser. No. 780,109 mentioned in the first sentence of this application. However, such arrangement possesses the limitation that a substantial run-in time may be required in order to align that portion of the spring end which applies maximum force, such that that maximum force is applied opposite the pivot axis defined by chordal edge 70.

Referring to the operation of the injector 10 incorporating the present invention, with particular reference to FIG. 1A, the armature 40 will typically describe a uniform pivoting motion about the pivot axis formed by chordal edge 70 as the solenoid 42 is alternately energized and de-energized. The illustration in solid line represents the valve in its closed condition with the ball 30 against seat 24. The broken-line illustration represents the entirety of armature 40 having been pivoted upwardly about the pivot axis defined by edge 70 and into engagement with the magnetic frame 48B, thereby lifting the ball 30 from the seat 24 to open the valve. The stroke of the ball valve element 30 is nominally 0.002 inch, such that the stroke of armature 40 at its leftmost end, as seen in FIG. 1A, is approximately twice that value. This motion is obtained in a repeatable manner about the pivot axis determined by straight edge 70 and by the concentrated spring force vector at position 82 such that the possibility of armature wobble or flutter is substantially eliminated. During operation of the injector 10, the armature 40 remains in contact with frame 48B along the pivot axis formed by chordal edge 70 due to the "cocking" force of the spring and the inertia of high-speed operation.

Although this invention has been shown and described with respect to detailed embodiments thereof, it will be understood by those skilled in the art that various changes in form and detail thereof may be made without departing from the spirit and scope of the claimed invention. For instance, it will be understood that the inclined spring seat might be provided by an inclined shim or washer positioned on a noninclined surface of the armature.

Having thus described a typical embodiment of the invention, that which is claimed as new and desired to secure by Letters Patent of the United States is:

1. In an electromagnetic fuel injector for an internal combustion engine having a valve axis and including a housing, a flat armature connected to a movable valve element arranged to cooperate with a valve seat, spring means for exerting a force in an axial direction on said armature, an electromagnetic means for exerting a force in an opposite direction on said armature when electrically energized, the improvement comprising:

said armature being generally circular and having a portion contoured to define a pivot axis for pivoting engagement with a stationary portion of said fuel injector, said pivot axis including at least two points defining the endpoints of a chord of said armature; and means for concentrating the force applied to said armature by said spring means such that the greater axial spring force is applied to the armature to that side of the valve axis remote from said pivot axis thereby to effect pivoting of said armature about said pivot axis.

2. The fuel injector of claim 1 wherein said armature is in substantially coaxial alignment with the valve axis, said spring means is a helical coil spring disposed in compression in substantially coaxial relation with said armature and said force-concentrating means comprises a spring seat disposed on said armature and having a surface inclined to a plane normal to said valve axis for engagement with an end of said spring thereby to concentrate said spring force.

3. The fuel injector of claim 2 wherein said spring includes a squared end for engagement in compression with said spring seat surface and said spring seat surface is inclined such that said spring is under relatively greater axial compression to that side of the valve axis remote from said pivot axis.

4. The fuel injector of claim 3 wherein said spring seat surface is at least partly axially recessed in said armature and wherein said spring seat surface is relatively shallowest where the spring engagement therewith is most remote from said pivot axis.

5. The fuel injector of claim 4 wherein the angle of said incline of said spring seat surface is less than about 10°.

6. The fuel injector of claim 4 wherein said pivot axis is provided by a chordal edge formed on said armature, said chordal edge being formed by the right-angle intersection of two surfaces.

7. The fuel injector of claim 1 wherein said pivot axis is provided by a chordal edge formed on said armature.

8. The fuel injector of claim 4 wherein said electromagnetic means includes a magnetic frame member having an annular portion in axial alignment with the region of the outer circumference of said armature for providing said stationary portion of said injector with which said pivot axis of said armature pivotally engages.

9. The fuel injector of claim 8 wherein said valve element is a ball.

10. The fuel injector of claim 7 wherein said valve element is a ball.

* * * * *